US012713191B2

(12) United States Patent
Miyamoto

(10) Patent No.: US 12,713,191 B2
(45) Date of Patent: Aug. 18, 2026

(54) HEARING MACHINE TUNING DEVICE, HEARING MACHINE, INFORMATION PROCESSING DEVICE, HEARING MACHINE TUNING METHOD, AND RECORDING MEDIUM

(71) Applicant: CASIO COMPUTER CO., LTD., Tokyo (JP)

(72) Inventor: Akito Miyamoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 236 days.

(21) Appl. No.: 18/376,694

(22) Filed: Oct. 4, 2023

(65) Prior Publication Data

US 2024/0121564 A1 Apr. 11, 2024

(30) Foreign Application Priority Data

Oct. 5, 2022 (JP) ................................ 2022-161237

(51) Int. Cl.
*H04R 25/00* (2006.01)

(52) U.S. Cl.
CPC ............ *H04R 25/70* (2013.01); *H04R 25/30* (2013.01); *H04R 25/505* (2013.01); *H04R 2225/39* (2013.01); *H04R 2225/55* (2013.01)

(58) Field of Classification Search
CPC .... H04R 2225/39; H04R 25/70; H04R 25/30; H04R 25/505; H04R 2225/55
See application file for complete search history.

(56) References Cited

U.S. PATENT DOCUMENTS 9,549,268 B2 * 1/2017 Barthel ............... H04R 25/505
2015/0016621 A1 * 1/2015 Wiggins ................ H04R 25/70
381/60

FOREIGN PATENT DOCUMENTS

EP 2595415 A1 * 5/2013 ............ H04R 25/70
JP 2012-511271 A 5/2012

* cited by examiner

*Primary Examiner* — Carolyn R Edwards
*Assistant Examiner* — Dylan Maguire Neece
(74) *Attorney, Agent, or Firm* — Fitch, Even, Tabin & Flannery LLP

(57) ABSTRACT

A hearing machine tuning device includes at least one processor, and the at least one processor acquires manual tuning information including information on manually tuned setting values of a hearing machine and information on manual tuning date and time, and supplies the hearing machine with automatic tuning information generated on the basis of the acquired manual tuning information and including automatic tuning setting values.

13 Claims, 11 Drawing Sheets

FIG. 6

221

| TIME ZONE | SETTING VALUE |
|---|---|
| 6:59-7:59 | SETTING VALUE A |
| 8:00-8:57 | SETTING VALUE B |
| 8:58-12:00 | SETTING VALUE C |
| 12:01-12:54 | SETTING VALUE D |
| 12:55-18:02 | SETTING VALUE C |
| 18:03-19:02 | SETTING VALUE B |
| 19:03-6:58 | SETTING VALUE A |

FIG. 8

222

| TUNING DATE AND TIME INFORMATION | SETTING VALUE | SOUND INFORMATION |
|---|---|---|
| 2022/02/01 (Tu) 6:55 | SETTING VALUE A | SOUND INFORMATION 01 |
| 2022/02/01 (Tu) 7:58 | SETTING VALUE B | SOUND INFORMATION 02 |
| 2022/02/01 (Tu) 8:56 | SETTING VALUE C | SOUND INFORMATION 03 |
| 2022/02/01 (Tu) 12:02 | SETTING VALUE D | SOUND INFORMATION 04 |
| 2022/02/01 (Tu) 12:50 | SETTING VALUE C | SOUND INFORMATION 05 |
| 2022/02/01 (Tu) 18:05 | SETTING VALUE B | SOUND INFORMATION 06 |
| 2022/02/01 (Tu) 19:08 | SETTING VALUE A | SOUND INFORMATION 07 |
| 2022/02/02 (We) 7:03 | SETTING VALUE A | — |
| 2022/02/02 (We) 8:02 | SETTING VALUE B | SOUND INFORMATION 08 |
| 2022/02/02 (We) 9:00 | SETTING VALUE C | SOUND INFORMATION 09 |
| 2022/02/02 (We) 12:00 | SETTING VALUE D | SOUND INFORMATION 10 |
| 2022/02/02 (We) 13:00 | SETTING VALUE C | SOUND INFORMATION 11 |
| 2022/02/02 (We) 18:01 | SETTING VALUE B | SOUND INFORMATION 12 |
| 2022/02/02 (We) 18:58 | SETTING VALUE A | SOUND INFORMATION 13 |
| ⋮ | ⋮ | ⋮ |
| 2022/02/05 (Sa) 8:00 | SETTING VALUE E | SOUND INFORMATION 27 |
| ⋮ | ⋮ | ⋮ |

FIG. 9

223

| ESTIMATED TIME ZONE | ESTIMATED SETTING VALUE | LOG DATA |
|---|---|---|
| WEEKDAY 6:59-7:59 | SETTING VALUE A | SOUND INFORMATION 01, —, ··· |
| WEEKDAY 8:00-8:57 | SETTING VALUE B | SOUND INFORMATION 02, SOUND INFORMATION 08, ··· |
| WEEKDAY 8:58-12:00 | SETTING VALUE C | SOUND INFORMATION 03, SOUND INFORMATION 09, ··· |
| WEEKDAY 12:01-12:54 | SETTING VALUE D | SOUND INFORMATION 04, SOUND INFORMATION 10, ··· |
| WEEKDAY 12:55-18:02 | SETTING VALUE C | SOUND INFORMATION 05, SOUND INFORMATION 11, ··· |
| WEEKDAY 18:03-19:02 | SETTING VALUE B | SOUND INFORMATION 06, SOUND INFORMATION 12, ··· |
| WEEKDAY-WEEKDAY 19:03-6:58 | SETTING VALUE A | SOUND INFORMATION 07, SOUND INFORMATION 13, ··· |
| WEEKDAY-HOLIDAY 19:03-7:59 | SETTING VALUE A | SOUND INFORMATION 26, ··· |
| HOLIDAY 8:00-10:14 | SETTING VALUE E | SOUND INFORMATION 27, ··· |
| HOLIDAY 10:15-13:19 | SETTING VALUE F | SOUND INFORMATION 28, ··· |
| HOLIDAY 13:20-15:14 | SETTING VALUE G | SOUND INFORMATION 29, ··· |
| HOLIDAY 15:15-19:04 | SETTING VALUE H | SOUND INFORMATION 30, ··· |
| HOLIDAY-HOLIDAY 19:05-8:29 | SETTING VALUE I | SOUND INFORMATION 31, ··· |
| HOLIDAY-WEEKDAY 19:05-6:58 | SETTING VALUE J | SOUND INFORMATION 32, ··· |
| ⋮ | ⋮ | ⋮ |

HEARING MACHINE TUNING DEVICE, HEARING MACHINE, INFORMATION PROCESSING DEVICE, HEARING MACHINE TUNING METHOD, AND RECORDING MEDIUM

CROSS-REFERENCE TO RELATED APPLICATIONS

This application claims the benefit of Japanese Patent Application No. 2022-161237, filed on Oct. 5, 2022, the entire disclosure of which is incorporated by reference herein

FIELD OF THE INVENTION

The present disclosure relates generally to a hearing machine tuning device, a hearing machine, an information processing device, a hearing machine tuning method, and a recording medium.

BACKGROUND OF THE INVENTION

When a hearing machine such as a hearing aid is used, the hearing machine is tuned according to a user's audiogram and a use environment of the hearing machine. For example, Unexamined Japanese Patent Application Publication (Translation of PCT Application) No. 2012-511271 discloses a method of collecting log data representing information on a sound environment in which a hearing aid is used, asking a user of the hearing aid to fill out a questionnaire, and tuning the hearing aid on the basis of the questionnaire data and the log data. The present disclosure has been made in view of the above circumstances, and has the advantage of providing a hearing machine tuning device that can easily tune a hearing machine, a hearing machine, an information processing device, a hearing machine tuning method, and a recording medium.

SUMMARY OF THE INVENTION

In order to achieve the above objective, an aspect of a hearing machine tuning device according to the present disclosure acquires manual tuning information including information on manually tuned setting values of a hearing machine and information on manual tuning date and time, and supplies the hearing machine with automatic tuning information generated based on the acquired manual tuning information and including automatic tuning setting values.

BRIEF DESCRIPTION OF DRAWINGS

A more complete understanding of this application can be obtained when the following detailed description is considered in conjunction with the following drawings, in which:

FIG. 6 is a diagram illustrating an example of an automatic tuning parameter according to Embodiments 1, 2, and 3;

FIG. 8 is setting value log data stored in a hearing machine tuning device according to Embodiments 1, 2, and 3;

FIG. 9 is setting value analysis data generated by a hearing machine tuning device according to Embodiments 1, 2, and 3;

DETAILED DESCRIPTION OF THE INVENTION

Figure 1:
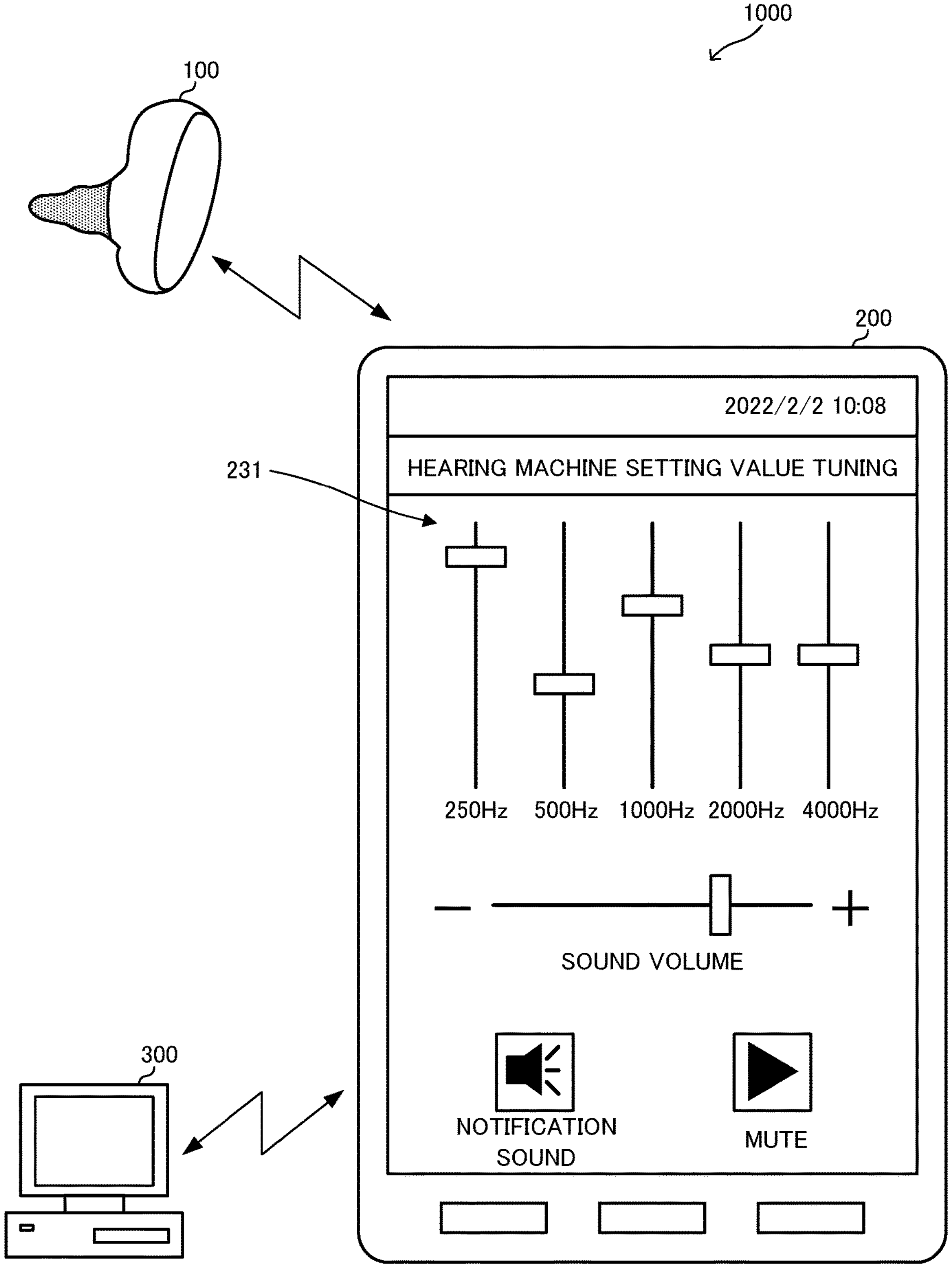
FIG. 1 is a diagram illustrating an example of a hearing machine tuning system according to Embodiments 1 and 2.

A hearing machine tuning device and the like according to embodiments are described with reference to the drawings. Note that the same reference numerals are given to the same or corresponding parts in the drawings.

Embodiment 1

A hearing machine tuning device 200 according to Embodiment 1 is a device including a program that stores, as log data, the time when a user (hearing machine user) tuned a hearing machine such as a hearing aid and a sound collector and setting details, generates parameters (automatic tuning information) for automatically tuning the hearing machine by analyzing the log data, and automatically tunes the hearing machine on the basis of the parameters.

As illustrated in FIG. 1, a hearing machine tuning system 1000 according to Embodiment 1 includes a hearing machine 100 and the hearing machine tuning device 200, and the hearing machine 100 and the hearing machine tuning device 200 operate by being communicably connected to each other by Bluetooth (registered trademark) and/or the like. As illustrated in FIG. 1, the hearing machine tuning system 1000 may further include an information processing device 300 communicably connected to the hearing machine tuning device 200. The information processing device 300 is mainly used by a doctor or a certified hearing aid technician, and can display the log data and/or the like stored in the hearing machine tuning device 200.

The hearing machine tuning device 200 can display, for example, a setting value tuning screen 231 as illustrated in FIG. 1, and tune (re-set) setting values in which various parameters related to hearing in the hearing machine 100 (values such as the degree of amplification and sound volume used when sound output by the hearing machine 100 is tuned). The setting values may be various parameter values themselves, or voltage values required by the hearing machine 100 in order to output sound based on the parameter values. FIG. 1 illustrates an example of the setting value tuning screen 231 for performing tuning of the degree of amplification for each specific frequency band (for example, frequency bands centered on 250 Hz, 500 Hz, 1 kHz, 2 kHz, and 4 kHz) in an audible band of a healthy person, tuning of overall sound volume, and setting of notification sound of the hearing machine tuning device 200 and mute for sound output of the hearing machine 100.

Figure 2:
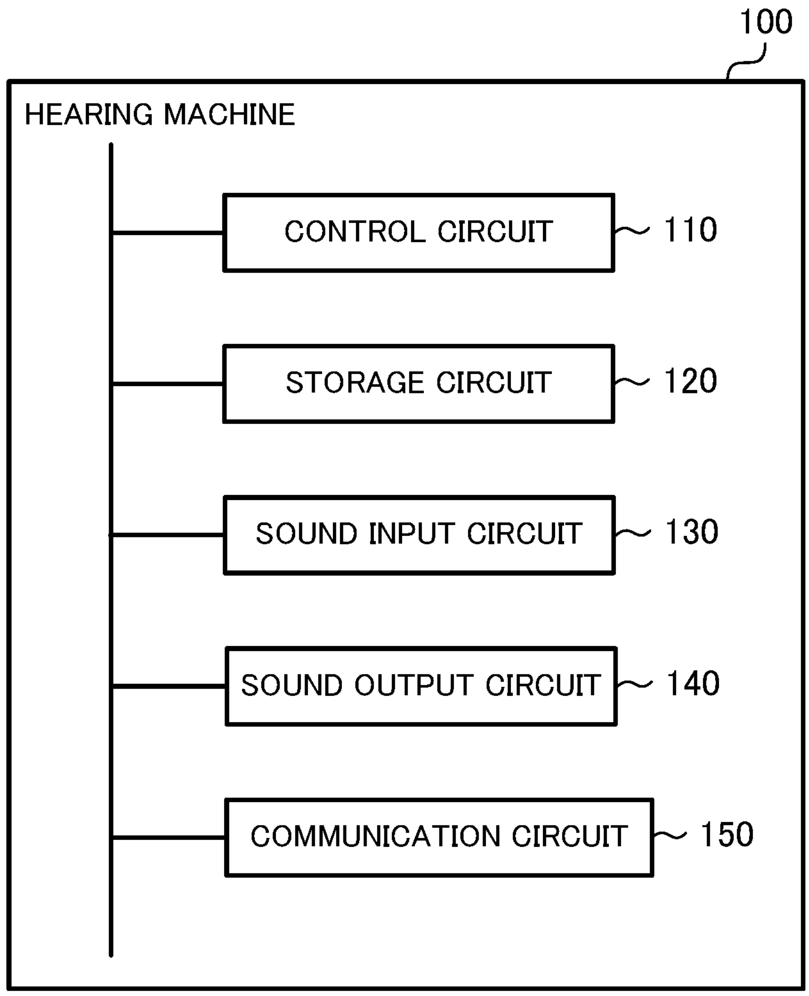
FIG. 2 is a diagram illustrating an example of a functional configuration of a hearing machine according to Embodiments 1 and 2.

As illustrated in FIG. 1, the hearing machine 100 according to Embodiment 1 is a small wearable device in the form of an earphone that is worn on a user's ear. As illustrated in FIG. 2, the hearing machine 100 includes a control circuit 110, a storage circuit 120, a sound input circuit 130, a sound output circuit 140, and a communication circuit 150 as functional configurations.

The control circuit 110 is configured by, for example, at least one processor such as a central processing unit (CPU) and a digital signal processor (DSP). The control circuit 110 performs various processes for operating the hearing machine 100 by executing programs stored in the storage circuit 120. For example, the control circuit 110 performs processing such as amplification on data of sound acquired by the sound input circuit 130 on the basis of tuned setting values (various parameters related to hearing) of the hearing machine 100, and causes the sound output circuit 140 to output sound by using the processed data. For example, the control circuit 110 performs a process of storing sound information (information on a voltage of a microphone) acquired by the sound input circuit 130 in the storage circuit 120, or transmitting the stored sound information to the hearing machine tuning device 200 through the communication circuit 150.

The storage circuit 120 stores the programs to be executed by the control circuit 110 and necessary data. The storage circuit 120 may include a random access memory (RAM), a read only memory (ROM), a flash memory, and/or the like; however, the present disclosure is not limited thereto. Note that the storage circuit 120 may be provided inside the control circuit 110. Information on the setting values of the hearing machine 100 received by the control circuit 110 from the hearing machine tuning device 200 via the communication circuit 150 is stored in the storage circuit 120 as tuned setting values, and the hearing machine 100 performs tuning (processing such as amplification) of sound to be output on the basis of the tuned setting values.

The sound input circuit 130 includes a microphone, an analog/digital (A/D) converter, and/or the like, and acquires ambient sound. Note that the sound input circuit 130 may acquire not only a value obtained by A/D converting information on the ambient sound, but also a value of a voltage generated in the microphone moment by moment. Then, the control circuit 110 continues to record these values (digital values obtained by A/D converting the sound acquired by the microphone and voltage values) acquired by the sound input circuit 130 in a ring buffer (sound information ring buffer) in the storage circuit 120 at a predetermined sampling frequency (for example, 44.1 kHz). The size of the ring buffer is arbitrary; however, in Embodiment 1, the ring buffer can store data for a sound information storage period (for example, about 10 seconds).

The sound output circuit 140 includes a digital/analog (D/A) converter, a speaker, and/or the like, and outputs ambient sound tuned on the basis of the setting values tuned by the control circuit 110. More specifically, the control circuit 110 performs amplification and/or the like on the digital data (data obtained by acquiring and A/D-converting sound around a user) of the sound acquired by the sound input circuit 130, on the basis of the tuned setting values (various parameters related to hearing such as the degree of amplification of each frequency band), and causes the sound output circuit 140 to output the processed data as sound.

The communication circuit 150 is a circuit as a communication interface for transmitting and receiving data between the hearing machine 100 and the hearing machine tuning device 200 by Bluetooth (registered trademark), and includes a communication antenna. By communicating with the hearing machine tuning device 200 through the communication circuit 150, the hearing machine 100 receives, for example, information on setting values from the hearing machine tuning device 200 or transmits sound information to the hearing machine tuning device 200. However, a communication standard compatible with the communication circuit 150 is not limited to Bluetooth (registered trademark), and may be a wireless communication interface compatible with a wireless local area network (LAN) and/or the like.

Figure 3:
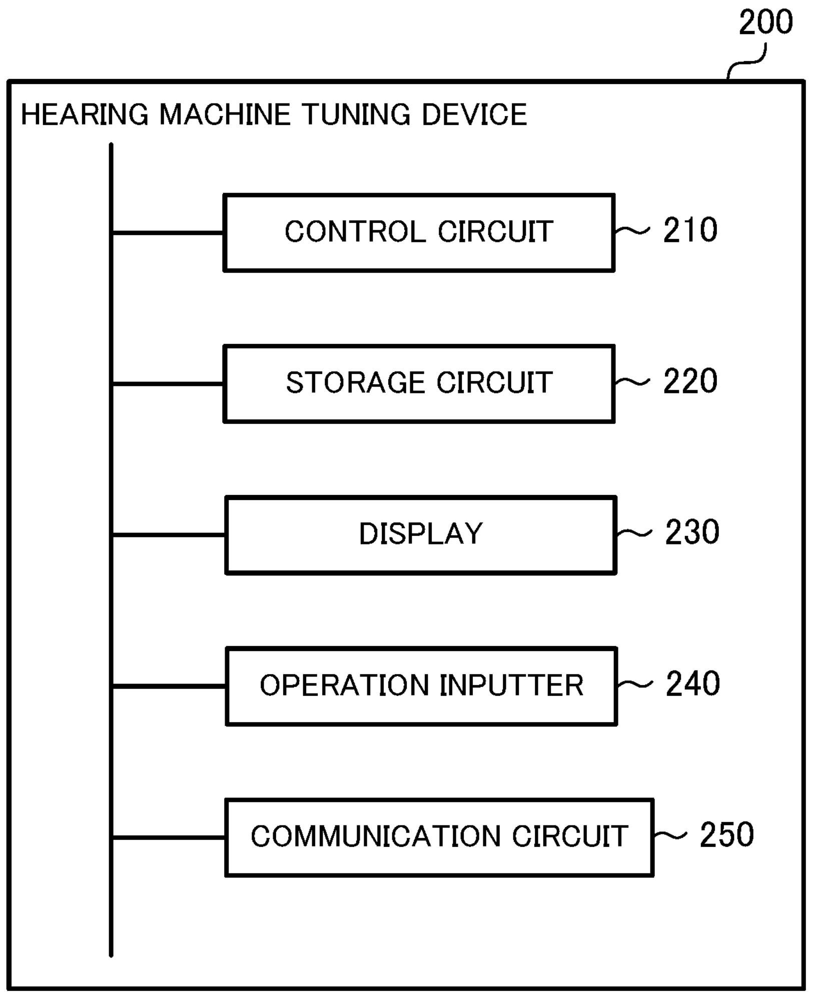
FIG. 3 is a diagram illustrating an example of a functional configuration of a hearing machine tuning device according to Embodiments 1 and 2.

The hearing machine tuning device 200 according to Embodiment 1 is, for example, a smartphone, and includes a control circuit 210, a storage circuit 220, a display 230, an operation inputter 240, and a communication circuit 250 as functional configurations as illustrated in FIG. 3.

The control circuit 210 is configured by, for example, at least one processor such as a CPU. The control circuit 210 performs an automatic tuning process and the like to be described below according to programs stored in the storage circuit 220. Note that the control circuit 210 includes an internal clock that can acquire date and time information. However, the hearing machine tuning device 200 may also include a radio clock or a positioning clock having a positioning function with a global positioning system (GPS), and in this case, the control circuit 210 does not need to have an internal clock and can acquire date and time information by using the radio clock or the positioning clock as a clock.

The storage circuit 220 stores the programs to be executed by the control circuit 210 and necessary data. The storage circuit 220 may include a RAM, a ROM, a flash memory, and/or the like; however, the present disclosure is not limited thereto. Note that the storage circuit 220 may be provided inside the control circuit 210.

The display 230 includes a display device such as a liquid crystal display or an organic electro-luminescence (EL) display.

The operation inputter 240 is a user interface such as a push button switch or a touch panel integrated with the display 230, and includes at least one of hardware keys or software keys. The operation inputter 240 receives operation inputs from a user. The control circuit 210 can acquire what kind of operation input a user has performed, on the basis of detection results of a tap operation on the touch panel and a pressed state of the switch.

The communication circuit 250 is a circuit as a communication interface for the hearing machine tuning device 200 to perform data communication with the hearing machine 100, the information processing device 300, external devices (for example, other smartphones, tablets, personal computers (PCs), and/or the like), and/or the like, or to acquire information from the Internet, and includes a communication antenna. The communication circuit 250 may include a wireless communication interface for performing communication via Bluetooth (registered trademark) or a wireless LAN, for example.

Figure 4:
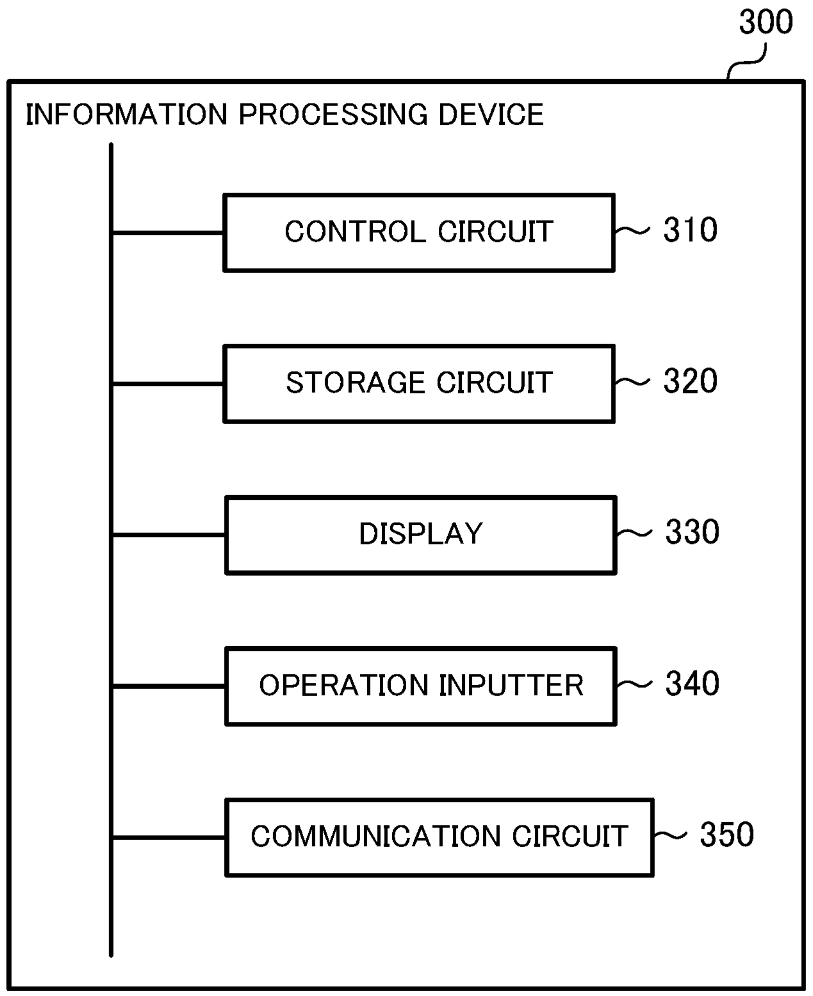
FIG. 4 is a diagram illustrating an example of a functional configuration of an information processing device according to Embodiments 1, 2, and 3.

The information processing device 300 according to Embodiment 1 is, for example, a PC, and includes a control circuit 310, a storage circuit 320, a display 330, an operation inputter 340, and a communication circuit 350 as functional configurations as illustrated in FIG. 4.

The control circuit 310 is configured by a processor such as a CPU, for example. The control circuit 310 performs a sound information display process and the like to be described below according to programs stored in the storage circuit 320.

The storage circuit 320 stores the programs to be executed by the control circuit 310 and necessary data. The storage circuit 320 may include a RAM, a ROM, a flash memory, and/or the like; however, the present disclosure is not limited thereto. Note that the storage circuit 320 may be provided inside the control circuit 310.

The display 330 includes a display device such as a liquid crystal display and an organic EL display, and displays information and/or the like received by the communication circuit 350.

The operation inputter 340 is a user interface such as a keyboard and mouse, and receives operation inputs from a user.

The communication circuit 350 is a circuit as a communication interface for the information processing device 300 to perform data communication with the hearing machine tuning device 200, the external devices, and/or the like, or to acquire information from the Internet, and includes a communication antenna. The communication circuit 350 may include a wireless communication interface for performing communication via Bluetooth (registered trademark) or a wireless LAN, for example.

Note that when distinguishing which device the control circuit 110, 210, or 310 belongs to, the control circuit 110 is referred to as a hearing machine control circuit, the control circuit 210 is referred to as a hearing machine tuning device control circuit or simply a control circuit, and the control circuit 310 is referred to as an information processing device control circuit. Furthermore, when distinguishing which device the communication circuit 150, 250, or 350 belongs to, the communication circuit 150 is referred to as a hearing machine communication circuit, the communication circuit 250 is referred to as a hearing machine tuning device communication circuit or simply a communication circuit, and the communication circuit 350 is referred to as an information processing device communication circuit. The same applies to the storage circuits 120, 220, and 320, the displays 230 and 330, and the operation inputters 240 and 340.

Figure 5:
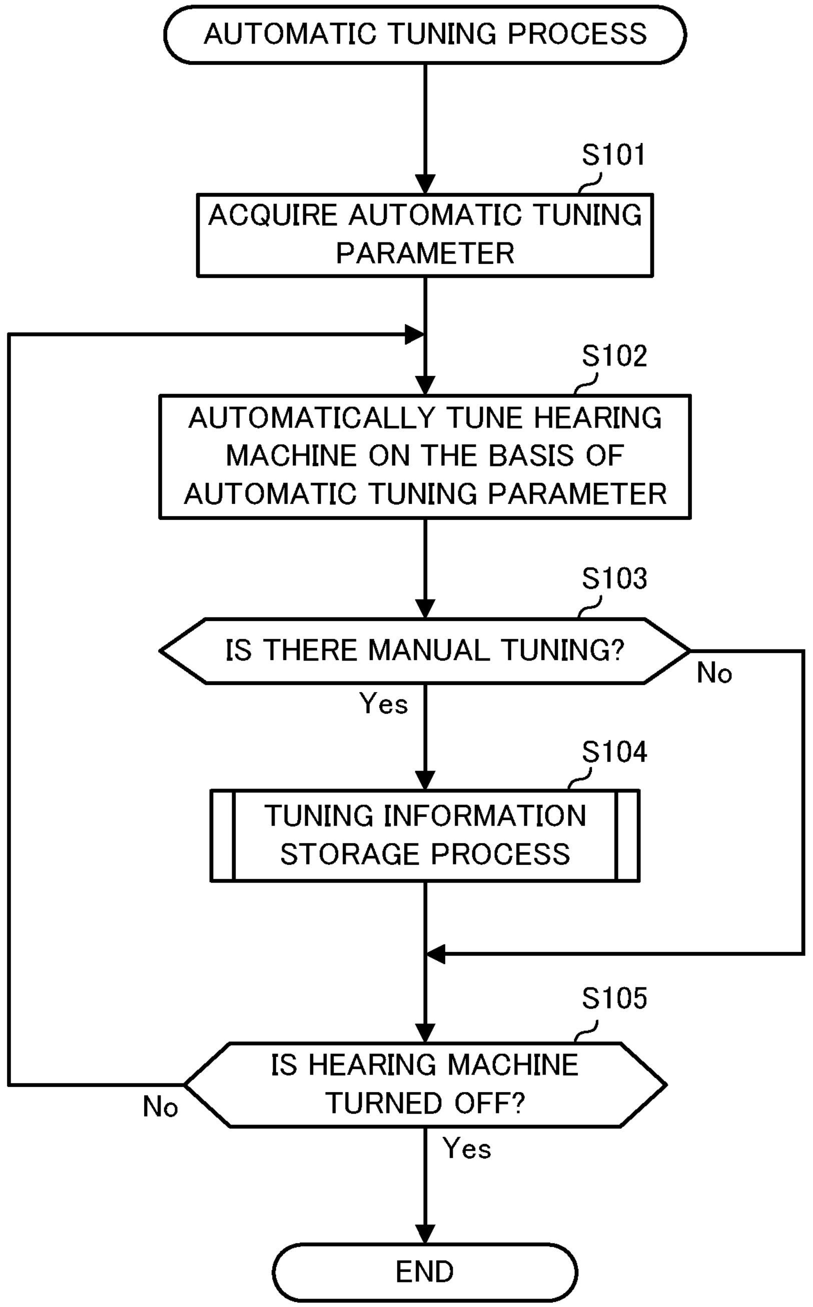
FIG. 5 is a flowchart illustrating a procedure of an automatic tuning process according to Embodiments 1, 2, and 3.

The automatic tuning process, which is a process in which the hearing machine tuning device 200 automatically tunes re-setting or switching of setting values of the hearing machine 100, is described with reference to FIG. 5. Note that the hearing machine 100 and the hearing machine tuning device 200 are assumed to be connected in advance by pairing. When the hearing machine 100 is powered on, the hearing machine tuning device 200 is connected to the hearing machine 100 via the communication circuit 250, and the execution of the automatic tuning process is started. Normally, the execution of the automatic tuning process is started when a user turns on the hearing machine 100 and wears the hearing machine 100 at the beginning of a day.

First, the control circuit 210 acquires automatic tuning parameters (automatic tuning information) 221 for that day (step S101). As illustrated in FIG. 6, the automatic tuning parameters 221 are data in which time zones (time zones corresponding to automatic tuning setting values to be described below) to be automatically tuned correspond to setting values (automatic tuning setting values or automatic tuning information including the automatic tuning setting values) used for automatic tuning, and the control circuit 210 generates and acquires the automatic tuning parameters 221 from analysis data to be described below. Note that the setting values are, for example, setting values set on the setting value tuning screen 231 illustrated in FIG. 1, and/or the like, and include a plurality of parameter values (the degree of amplification for each specific frequency band, overall sound volume, and the like), but since describing all these values causes the complexity, individual notations such as "setting value A" and "setting value B" are used in FIG. 6 and FIGS. 8 and 9 to be described below so that a plurality of setting values having one or more parameter values different from each other can be easily distinguished.

Subsequently, the control circuit 210 automatically tunes the hearing machine 100 on the basis of the automatic tuning parameters (step S102). More specifically, the control circuit 210 refers to the automatic tuning parameters 221 to call a setting value to be switched next, and when the current time zone reaches a setting value switching timing or a switching timing is approached, the control circuit 210 transmits (supplies) information on a setting value to be switched, which corresponds to the current time zone, the hearing machine 100 (via the communication circuit 250). The control circuit 110 of the hearing machine 100 receives the information on the setting value (via the communication circuit 150) and causes the sound output circuit 140 to output sound tuned on the basis of the setting value. Therefore, by transmitting information on a setting value for each time zone from the hearing machine tuning device 200, the hearing machine 100 is automatically tuned to an appropriate setting value for each time zone. In this case, the hearing machine 100 needs to have no internal clock because the setting value may be tuned at the timing of receiving the information on the setting value. That is, Embodiment 1 can contribute to weight reduction and simplification of the hearing machine 100.

Subsequently, the control circuit 210 determines whether there is an input for manual tuning of the hearing machine 100 (normally performed by the operation inputter 240) (step S103). This manual tuning is performed, for example, on the setting value tuning screen 231 of the hearing machine tuning device 200 illustrated in FIG. 1. When there is no input for manual tuning (step S103; No), the procedure proceeds to step S105. Note that the manual tuning is so-called tuning by manual operation (tuning by artificial operation), and is not necessarily limited to operation by hands or fingers, and may be operation based on instructions by human voice. For example, when the hearing machine tuning device 200 has a sound collecting microphone as the operation inputter 240 and a voice recognition program, an input for manual tuning by voice becomes possible.

When there is the input for manual tuning (step S103; Yes), the control circuit 210 performs a tuning information storage process that is a process for storing manual tuning information including manually tuned setting values and manual tuning time or time zone (step S104), and proceeds to step S105. Details of the tuning information storage process are described below.

In step S105, the control circuit 210 determines whether the hearing machine 100 is powered off. Since the pairing connection has already been set between the hearing machine tuning device 200 and the hearing machine 100, the control circuit 210 can determine via the communication circuit 250 that the hearing machine 100 has been powered off.

When the hearing machine 100 is not powered off (step S105; No), the control circuit 210 returns to step S102 and repeats the automatic tuning of the hearing machine 100 based on the automatic tuning parameters 221.

When the hearing machine 100 is powered off (step S105; Yes), the control circuit 210 ends the automatic tuning process.

Figure 7:
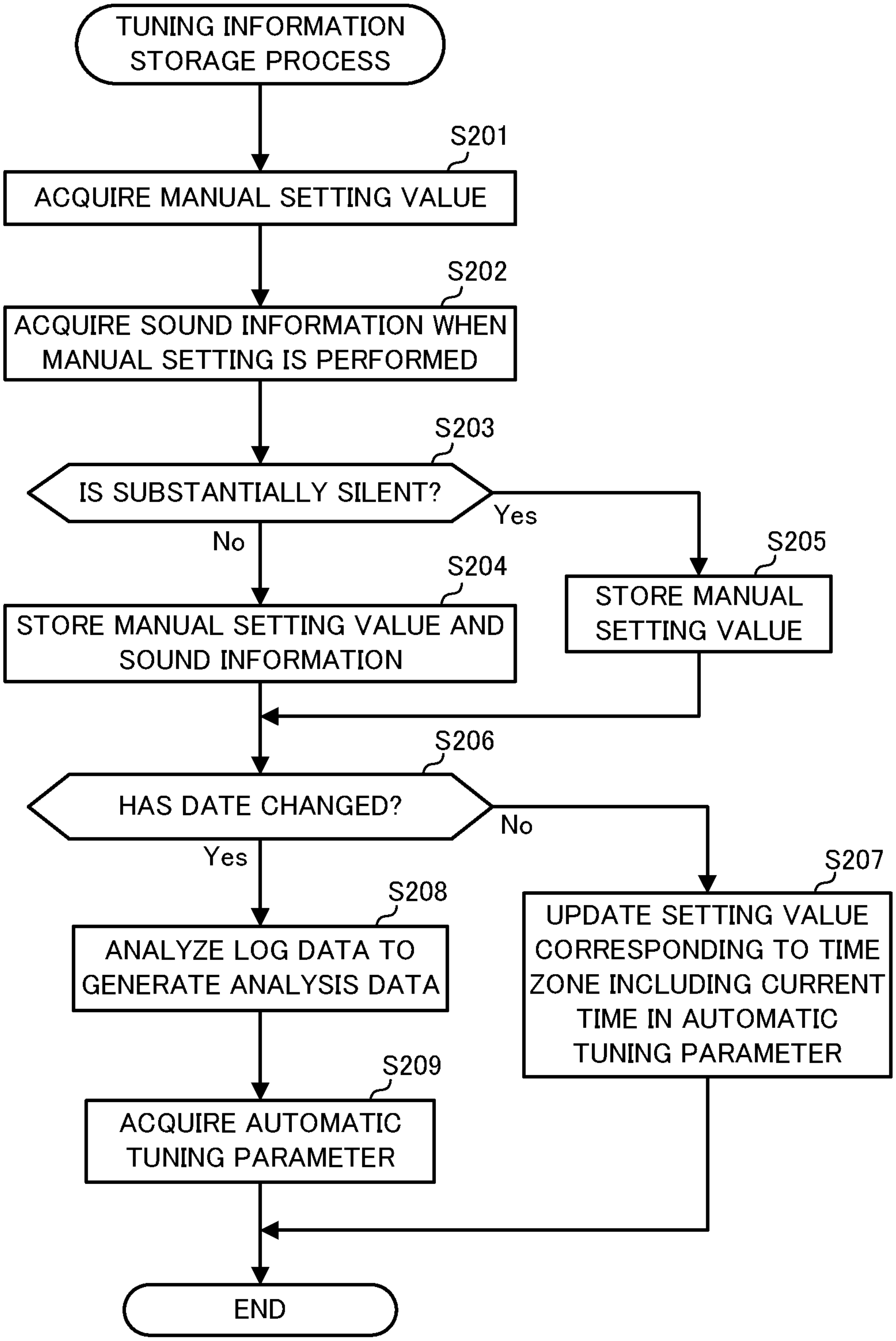
FIG. 7 is a flowchart illustrating a procedure of a tuning information storage process according to Embodiments 1, 2, and 3.

The tuning information storage process performed in step S104 is described below with reference to FIG. 7. This process is a process of storing, as log data, setting values tuned by the manual tuning, tuning date and time information indicating the date and time of tuning, and sound information, analyzing changes in a user's sound environment during one day for a plurality of days, and generating analysis data.

First, the control circuit 210 acquires a manually tuned setting value (setting value input by the manual tuning) from the operation inputter 240, and also acquires information on the date and time when the input for the manual tuning was made (step S201). Specifically, the control circuit 210 acquires the manually tuned setting value according to an external environment around a user, the circumstances of which change over time, as a value input by the user through the setting value tuning screen 231 of FIG. 1, for example. Information on the manually tuned setting value is transmitted (supplied) to the hearing machine 100 via the communication circuit 250, and the control circuit 110 of the hearing machine 100 tunes sound that is output from the sound output circuit 140, on the basis of the received information on the manually tuned setting value.

As described above, since the circumstances such as the external environment around a user change over time, the user may manually tune the hearing machine 100 according to changes in the circumstances. Accordingly, in step S201, the control circuit 210 can acquire the manually tuned setting value and the information on the date and time, thereby acquiring setting values of the hearing machine 100 to be tuned to be suitable for the changed circumstances and information on the date and time when the circumstances have changed (information on the date and time when manual tuning was performed (manual tuning date and time)).

Subsequently, the control circuit 210 acquires sound information when the manual setting is performed (step S202). More specifically, the control circuit 210 first transmits a request signal to the hearing machine 100 via the communication circuit 250 to request transmission of information on a sound information ring buffer. Upon receiving the request signal, the hearing machine 100 transmits data for the sound information ring buffer at that point in time to the hearing machine tuning device 200. Accordingly, the control circuit 210 acquires the sound information when the manual setting was performed by receiving the data for the sound information ring buffer. That is, sound information for a sound information storage period (for example, about 10 seconds) immediately before the setting is performed is acquired.

The sound information may be any data as long as data for a user's sound environment at that point in time is obtained; however, in Embodiment 1, time-series data for the voltage of the microphone for the sound information storage period (data showing how the voltage is changing moment by moment). The voltage change of the microphone can be considered as raw data representing a sound environment around the microphone, so that in Embodiment 1, the sound environment of a user of the hearing machine 100 at that point in time can be accurately ascertained.

Subsequently, on the basis of the sound information acquired in step S202, the control circuit 210 determines whether the surroundings of the user were substantially silent during the manual setting (step S203). When the surroundings of the user is not substantially silent (step S203; No), the control circuit 210 stores the information on the date and time when the manual setting was performed (tuning date and time information), the manually tuned setting value acquired in step S201, and the sound information acquired in step S202 in the storage circuit 220 as log data (manual tuning information) 222 (step S204) as illustrated in FIG. 8, and proceeds to step S206. Note that in FIG. 8, the sound information is written as "sound information 01" and the like; however, the data stored in the sound information ring buffer of the hearing machine 100 is actually stored in the log data 222 as sound information.

On the other hand, when the surroundings of the user are substantially silent during the manual setting (step S203; Yes), the control circuit 210 stores the information on the date and time when the manual setting was performed (tuning date and time information) and the manually tuned setting value acquired in step S201 in the storage circuit 220 as log data 222 (step S205), and proceeds to step S206. When the surroundings of the user are substantially silent during the manual setting, the sound information is written as "-" as in the example of tuning date and time information "2022/02/02 (We) 7:03" in the example illustrated in FIG. 8.

The processes of steps S203 and S205 eliminate the need to store, as the log data 222, sound information indicating that the surroundings of the user are substantially silent, so that the size of the log data 222 can be saved. However, when there is no need to save the size of the log data 222, the control circuit 210 may always perform the process of step S204 without performing the processes of steps S203 and S205.

In step S206, the control circuit 210 determines whether the date has changed since the last time the log data 222 was recorded (step S206). When the date has not changed (step S206; No), the control circuit 210 updates a setting value corresponding to a time zone including the current time out of the data of the automatic tuning parameters 221 acquired in step S101 of the automatic tuning process (FIG. 5) by overwriting the setting value with the manually tuned setting value acquired in step S201 (step S207), and ends the tuning information storage process. On the other hand, when the date has changed (step S206; Yes), the control circuit 210 collectively analyzes the acquired log data 222 to generate analysis data 223 (step S208). More specifically, the control circuit 210 first aggregates setting values for each hour of a plurality of days, on which the life cycle is estimated to be similar, on the basis of the log data 222, groups setting values in which characteristics of the manually tuned setting value and the time zone of the setting value are common among the aggregated setting values, and estimates the time when the setting is changed and a setting value at that time, respectively. Subsequently, the control circuit 210 generates analysis data 223 in which estimated time zones and estimated setting values are associated with each other, as illustrated in FIG. 9. Note that in the analysis data 223 illustrated in FIG. 9, sound information is also recorded as information of the log data 222 used when the estimated time zones and the estimated setting values are estimated. As the log data 222 recorded in the analysis data 223, not only the sound information but also corresponding tuning date and time information and manually tuned setting values may be recorded.

The method of analyzing the log data 222 in step S208 is arbitrary; however, for example, days with roughly the same time zone and number of times of manual setting in one day are assumed to have a similar life cycle of the sound environment and estimated time zones and estimated setting values may be obtained from data obtained by respectively averaging tuning date and time information and manually tuned setting values for such days. Furthermore, the control circuit 210 uses information on days of the week and national holidays, assumes that the same days of the week, the same weekdays, and the same holidays are to have similar life cycles, and estimates whether an acquired manual tuning date is a weekday or a holiday. The control circuit 210 may obtain estimated time zones and estimated setting values from data obtained by respectively averaging tuning date and time information and manually tuned setting values for such days.

For example, in the log data 222 illustrated in FIG. 8, since manual setting was performed seven times on both February 1st (Tuesday) and February 2nd (Wednesday), set time zones are also similar, and the two days are weekdays, the two days are assumed to have similar life cycles. The first manual setting on February 1st was performed at 6:55 and the setting value A was set at this time, but since the next manual setting is 7:58, the time zone set for the setting value A is 6:55 to 7:57. Furthermore, the first manual setting on February 2nd was performed at 7:03 and the setting value A was set at this time, but since the next manual setting is 8:02, the time zone set for the setting value A is 7:03 to 8:01.

Accordingly, the first manually set time zone on February 1st is 6:55 to 7:57 and the manually tuned setting value at this time is the setting value A, but the first manually set time zone on February 2nd is 7:03 to 8:01 and the manually tuned setting value at this time is the setting value A. Subsequently, the control circuit 210 can obtain 6:59 to 7:59 as an estimated time zone by respectively averaging these time zones and the manually tuned setting values, and obtain the setting value A (since the setting value A was the same on both days, even though averaging is performed, the setting value A is obtained) as an estimated setting value. The control circuit 210 can also obtain, from the log data 222, the fact that the sound information when the setting value A is set in these time zones is "sound information 01" and "–", respectively.

In the above example, the notation indicates that the end time of time zone 1 is 1 minute before the start time of the next time zone 2 so that the end time of the time zone 1 and the start time of the next time zone 2 are not the same, for example; however, the actual end time is the timing at which that time ends (for example, when the end time is 7:59, the real end time is 7:59:59.999 . . . ). The method of recording the log data 222 is not limited to the above example, and by making the end time of the time zone 1 and the start time of the next time zone 2 the same, the time zone 1 may end immediately before the end time (for example, when the end time is 8:00, the real end time is 7:59:59.999 . . . ).

For example, between the setting value A and the setting value B whose setting is changed next, priority may be given to one with the higher degree of amplification of sound output (higher sensitivity). Specifically, in a case in which the degree of amplification at the setting value A is higher than the degree of amplification at the setting value B, when the end time of the time zone of the setting value A is 7:57 and the start time of the time zone of the setting value B on February 1 is 7:58 and the end time of the time zone of the setting value A is 8:01 and the start time of the time zone of the setting value B on February 2 is 8:02, the switching timing from the time zone of the setting value A to be automatically tuned on the next day to the time zone of the setting value B is 8:02.

In this way, even though there is a variation in the time zone of each day corresponding to a certain setting value, when the certain setting value has a higher degree of amplification than the other setting values in adjacent time zones, the latest timing of the timings for switching from the time zone of the corresponding certain setting value to another setting value on each day so that the time zone of the certain setting value is the longest is set to be the timing of switching from the certain setting value to another setting value on a day to be automatically tuned next, so that missed hearing due to the setting can be suppressed.

"Estimated time zone 'weekday 6:59-7:59', estimated setting value 'setting value A', and log data 'sound information 01, –, . . . '" in the first row of the analysis data 223 illustrated in FIG. 9 are obtained in this way. The other rows illustrated in FIG. 9 are also obtained in the same and/or similar way, but for time zones that span different days, since the first manually set time may be different when patterns of the two days are the same or different, separate estimated time zones are provided such as "weekday-weekday 19:03-6:58" and "weekday-holiday 19:03-7:59".

Returning to FIG. 7, the control circuit 210 acquires the automatic tuning parameters 221 from the analysis data 223 generated in step S208 (step S209), and ends the tuning information storage process. Specifically, in the process of step S209, when that day is a weekday and the next day is also a weekday, the control circuit 210 extracts, from the analysis data 223, estimated time zones of weekdays ("weekday HH:MM") and estimated time zones from weekdays to weekdays (weekday-weekday HH:MM), and uses the extracted estimated time zones as the automatic tuning parameters 221. For example, the automatic tuning parameters 221 illustrated in FIG. 6 are generated by extracting, from the analysis data 223 illustrated in FIG. 9, estimated time zones of weekdays and estimated time zones from weekdays to weekdays.

Note that when the time changes due to daylight saving time or when a user moves between two regions with a time difference, the time included in the tuning date and time information of the log data 222 is shifted. In this case, the log data 222 up to that point may be reset and new log data 222 may be collected according to a user's selection in the time zone of a region where the user is currently located, or subsequently the log data 222 up to that point may be corrected by applying daylight saving time and time zone information to generate analysis data 223.

Through the above automatic tuning process and tuning information storage process, the control circuit 210 generates the analysis data 223 from the log data 222 (setting information (tuning date and time information and manually tuned setting values) in a user's actual use environment), acquires the automatic tuning parameters 221 from the analysis data 223, and transmits information on the setting values to the hearing machine 100 for each time zone, thereby automatically tuning the hearing machine 100. Accordingly, in the method of tuning the hearing aid in the related art, since a computer-based questionnaire including a large number of questions about the subjective experience of hearing aid users is conducted, reproducing an environment in which a user actually uses the hearing aid was difficult even though the large number of questions are prepared, and answering a large number of questions was complicated. However, in the present embodiment, the tonality of the hearing machine can be easily performed.

Figure 10:
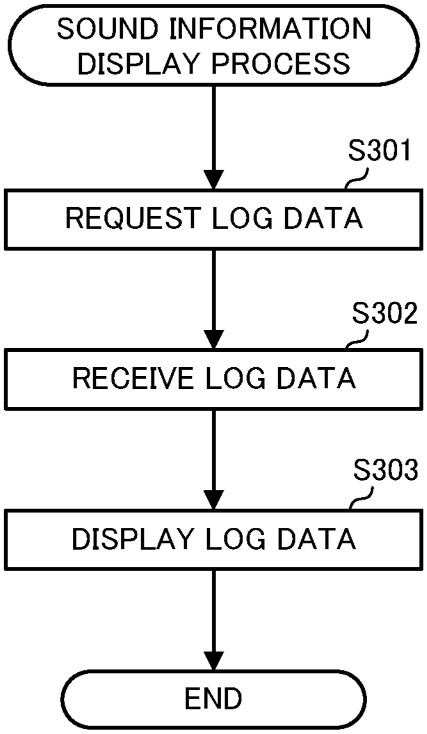
FIG. 10 is a flowchart illustrating a procedure of a sound information display process according to Embodiments 1, 2, and 3.

A sound information display process in which the information processing device 300 displays the log data 222 and/or the like is described below with reference to FIG. 10. In this process, when a user (mainly a doctor or a certified hearing aid technician) of the information processing device 300 instructs the execution of the sound information display process using the operation inputter 340 (for example, starts an application program for performing the sound information display process), the execution of the sound information display process is started.

First, the control circuit 310 requests the log data 222 from the hearing machine tuning device 200 (step S301). Note that the hearing machine tuning device 200 is assumed to store in advance a program for transmitting the log data 222 to the information processing device 300 when the information processing device 300 requests the log data 222. Accordingly, when the information processing device 300 requests the log data 222 from the hearing machine tuning device 200 in step S301, the hearing machine tuning device 200 transmits the requested log data 222 to the information processing device 300.

Subsequently, the control circuit 310 receives the log data 222 transmitted by the hearing machine tuning device 200 (step S302). Subsequently, the control circuit 310 displays the received log data 222 on the display 330 (step S303), and then ends the sound information display process by a user's operation.

The display of the log data 222 in step S303 is described in more detail. First, on the basis of the tuning date and time information and the manually tuned setting values included in the log data 222, the control circuit 310 displays manually set degree of amplification and sound volume values for each frequency band for each time zone. On the basis of the sound information included in the log data 222, the control circuit 310 displays the frequency spectrum of sound acquired by the hearing machine 100 through the sound input circuit 130 at the time of each manual setting. When the information processing device 300 includes sound output means (a speaker and/or the like), the control circuit 310 may cause the sound output means to output sound obtained by reproducing the sound acquired by the hearing machine 100 through the sound input circuit 130 at the time of each manual setting, on the basis of the sound information.

Through the sound information display process described above, the control circuit 310 displays information representing detailed content of the log data 222 (manually tuned setting values for each time zone, the frequency spectrum of sound, and/or the like) on the display 330. Accordingly, a user of the information processing device 300 (medical worker, certified hearing aid technician, and/or the like) can confirm whether manually setting values are appropriate by confirming the information on the display 330, and appropriate advice can be given to a user of the hearing machine 100 or the setting values of the hearing machine 100 can be tuned to more appropriate values.

Note that the above sound information display process (FIG. 10) is a process for displaying the information of the log data 222 (manually tuned setting values for each time zone, the frequency spectrum of sound, and/or the like) on the display 330 of the information processing device 300; however, the hearing machine tuning device 200 can also display the information of the log data 222 on the display 230. To this end, the control circuit 210 simply performs a process of step S303 in a flowchart illustrated in FIG. 10. Also in this case, when the hearing machine tuning device 200 includes sound output means (a speaker and/or the like), the control circuit 210 may cause the sound output means of the hearing machine tuning device 200 to output sound obtained by reproducing sound acquired by the hearing machine 100 through the sound input circuit 130 at the time of each manual setting, on the basis of the sound information.

A user of the hearing machine 100 can confirm whether manually setting values in the past are appropriate by confirming the information through the display 230 of the hearing machine tuning device 200 even without the information processing device 300.

In the above description, the display 330 of the information processing device 300 and the display 230 of the hearing machine tuning device 200 display the information of the log data 222 (manually tuned setting values for each time zone, the frequency spectrum of sound, and/or the like); however, an object to be displayed is not limited to the log data 222. For example, the information processing device 300 may receive the analysis data 223 from the hearing machine tuning device 200 and display the information of the analysis data 223 on the display 330. Thus, a doctor and/or the like can confirm whether an analysis by the hearing machine tuning device 200 is appropriate.

In addition to displaying information, the information processing device 300 may edit, for example, the estimated time zones and the estimated setting values of the analysis data 223 and transmit the edited data to the hearing machine tuning device 200. Thus, when a doctor and/or the like determines that an analysis by the hearing machine tuning device 200 is not appropriate, the hearing machine tuning device 200 can be provided with an estimated time zone and an estimated setting value that are considered more appropriate. Note that the analysis data 223 is normally updated to data newly generated in step S208 of the tuning information storage process (FIG. 7) when a day changes; however, the analysis data 223 provided by a doctor and/or the like may be prevented from being updated in step S208 by, for example, adding a flag indicating update prohibition to the analysis data 223.

Embodiment 2

The automatic tuning process (FIG. 5) in Embodiment 1 described above is performed by the control circuit 210 of the hearing machine tuning device 200, the information on the setting values is transmitted to the hearing machine 100 in step S102 at the timing at which the setting values are to be tuned and changed, and the control circuit 110 of the hearing machine 100 causes the sound output circuit 140 to output sound tuned on the basis of the setting values indicated by the transmitted information. That is, the hearing machine 100 passively outputs sound at the switching timing designated by the hearing machine tuning device 200 in accordance with the setting values actively automatically tuned by the hearing machine tuning device 200. However, the control circuit 110 of the hearing machine 100 may perform a process similar to the automatic tuning process. Such Embodiment 2 is described.

A hearing machine tuning system according to Embodiment 2 also includes the hearing machine 100 and the hearing machine tuning device 200 such as a smartphone, similarly to the hearing machine tuning system according to Embodiment 1, and the functional configurations of the hearing machine 100 and the hearing machine tuning device 200 are roughly as illustrated in FIGS. 2 and 3, respectively; however, the hearing machine 100 includes an internal clock that can acquire date and time information. The hearing machine tuning system according to Embodiment 2 may also include an information processing device 300 similar to the information processing device 300 of Embodiment 1, and the functional configuration of the information processing device 300 is as illustrated in FIG. 4.

An automatic tuning process according to Embodiment 2 is described with reference to FIG. 5. First, the control circuit 110 acquires automatic tuning parameters 221 for that day (step S101). More specifically, the control circuit 110 first requests the automatic tuning parameters 221 from the hearing machine tuning device 200 via the communication circuit 150. Subsequently, since the control circuit 210 of the hearing machine tuning device 200 acquires the automatic tuning parameters 221 for that day from analysis data and transmits the acquired automatic tuning parameters 221 to the hearing machine 100 via the communication circuit 250, the control circuit 110 of the hearing machine 100 acquires the automatic tuning parameters 221 by receiving the automatic tuning parameters 221 via the communication circuit 150.

The timing at which the hearing machine tuning device 200 transmits the automatic tuning parameters 221 or the timing at which the hearing machine 100 receives the automatic tuning parameters 221 may not be the switching timing of setting values as long as a pairing connection has been established between the hearing machine tuning device 200 and the hearing machine 100. The amount of data of the automatic tuning parameters 221 transmitted by the hearing machine tuning device 200 or the amount of data of the automatic tuning parameters 221 received and stored by the hearing machine 100 may be an amount corresponding to, for example, 24 hours or one week as long as the amount of data can be stored in the storage circuit 120, and is not limited thereto.

Subsequently, the control circuit 110 automatically tunes the hearing machine 100 on the basis of the automatic tuning parameters (step S102). More specifically, the control circuit 110 refers to the automatic tuning parameters 221 acquired in step S101 to call up setting values, and when the current time zone reaches the switching timing of the setting values, the control circuit 110 of the hearing machine 100 automatically changes the setting value and tunes sound that is output from the sound output circuit 140 on the basis of the changed setting value. Accordingly, the control circuit 110 spontaneously performs the process of step S102 when the switching timing of the setting value is reached, so that the hearing machine 100 is automatically tuned on the basis of an appropriate setting value for each time zone. Thus, even though the pairing connection with the hearing machine 100 is not established due to complete turning-off of the hearing machine tuning device 200 and/or the like at the switching timing of the setting value, the hearing machine 100 can appropriately switch the setting value at the switching timing.

Subsequently, the control circuit 110 determines whether the hearing machine 100 has been manually tuned (step S103). More specifically, the control circuit 110 determines whether information on manually tuned setting values (for example, performed on the setting value tuning screen 231) has been received from the hearing machine tuning device 200 via the communication circuit 150. When the manual tuning has not been performed (step S103; No), the procedure proceeds to step S105.

When the manual tuning has been performed (step S103; Yes), the control circuit 110 performs a tuning information storage process (step S104), and proceeds to step S105. More specifically, the tuning information storage process is performed by the control circuit 210 as described below, the control circuit 210 transmits the automatic tuning parameters 221 updated in step S207 or acquired in step S209 of the tuning information storage process to the hearing machine 100 (via the communication circuit 250), and the control circuit 110 acquires the automatic tuning parameters 221 (via the communication circuit 150).

In step S105, the control circuit 110 determines whether to turn off the hearing machine 100. For example, when the power switch of the hearing machine 100 is turned off, the control circuit 110 performs a process of turning off the power of the hearing machine 100, and at this time, the determination in step S105 is Yes.

When the hearing machine 100 is not turned off (step S105; No), the control circuit 110 returns to step S102 and repeats the automatic tuning of the hearing machine 100 based on the automatic tuning parameters 221.

When the hearing machine 100 is turned off (step S105; Yes), the control circuit 110 ends the automatic tuning process and performs a process of turning off the hearing machine 100.

Subsequently, the tuning information storage process according to Embodiment 2 performed in step S104 is described with reference to FIG. 7. This process is performed by the control circuit 210 of the hearing machine tuning device 200 as in Embodiment 1; however, the tuning information storage process is stated when an operation input for manual setting of the hearing machine 100 is performed on the operation inputter 240 (setting value tuning screen 231) of the hearing machine tuning device 200.

Since processes from step S201 to step S206 and a process of step S208 are the same as the processes in the tuning information storage process according to Embodiment 1, description thereof is omitted.

In step S207, the control circuit 210 updates a setting value, which corresponds to a time zone including the current time among the data of the automatic tuning parameters 221 transmitted to the hearing machine 100 in step S101 of the automatic tuning process (FIG. 5) according to Embodiment 2, to the manually tuned setting value acquired in step S201, transmits the updated automatic tuning parameters 221 to the hearing machine 100, and then ends the tuning information storage process.

In step S209, the control circuit 210 acquires the automatic tuning parameters 221 from the analysis data 223 generated in step S208, transmits the acquired automatic tuning parameters 221 to the hearing machine 100, and then ends the tuning information storage process.

As can be seen from the above description, the automatic tuning process according to Embodiment 2 is the same as the automatic tuning process according to Embodiment 1, except that the subject of the process changes from the control circuit 210 to the control circuit 110 and the control circuit 110 acquires the automatic tuning parameters 221 from the control circuit 210 at the first time (step S101) and each time the manual tuning is performed (step S104).

Through the above automatic tuning process and tuning information storage process, the control circuit 210 generates the analysis data 223 from the log data 222 and acquires the automatic tuning parameters 221 from the analysis data 223. Subsequently, the control circuit 110 can automatically tune the hearing machine 100 by acquiring the automatic tuning parameters 221 from the hearing machine tuning device 200 and changing setting values to setting values for each time zone.

The sound information display process according to Embodiment 2 is completely the same as the sound information display process (FIG. 10) according to Embodiment 1. A user of the information processing device 300 according to Embodiment 2 can also confirm whether manually set values are appropriate by confirming manually tuned setting values for each time zone and the frequency spectrum of sound through the display 330, and appropriate advice can be given to a user of the hearing machine 100 or the setting values of the hearing machine 100 can be tuned to more appropriate values.

The hearing machine tuning device 200 according to Embodiment 2 is also the same as Embodiment 1 in that the information of the log data 222 (manually tuned setting values for each time zone, the frequency spectrum of sound, and/or the like) can be displayed on the display 230. A user of the hearing machine 100 according to Embodiment 2 can confirm whether manually setting values in the past are appropriate by confirming the information through the display 230 of the hearing machine tuning device 200 even without the information processing device 300.

Embodiment 3

In Embodiments 1 and 2 described above, the hearing machine 100 and the hearing machine tuning device 200 are separate devices; however, the hearing machine 100 and the hearing machine tuning device 200 may be integrated into one device. Such Embodiment 3 is described.

Figure 11:
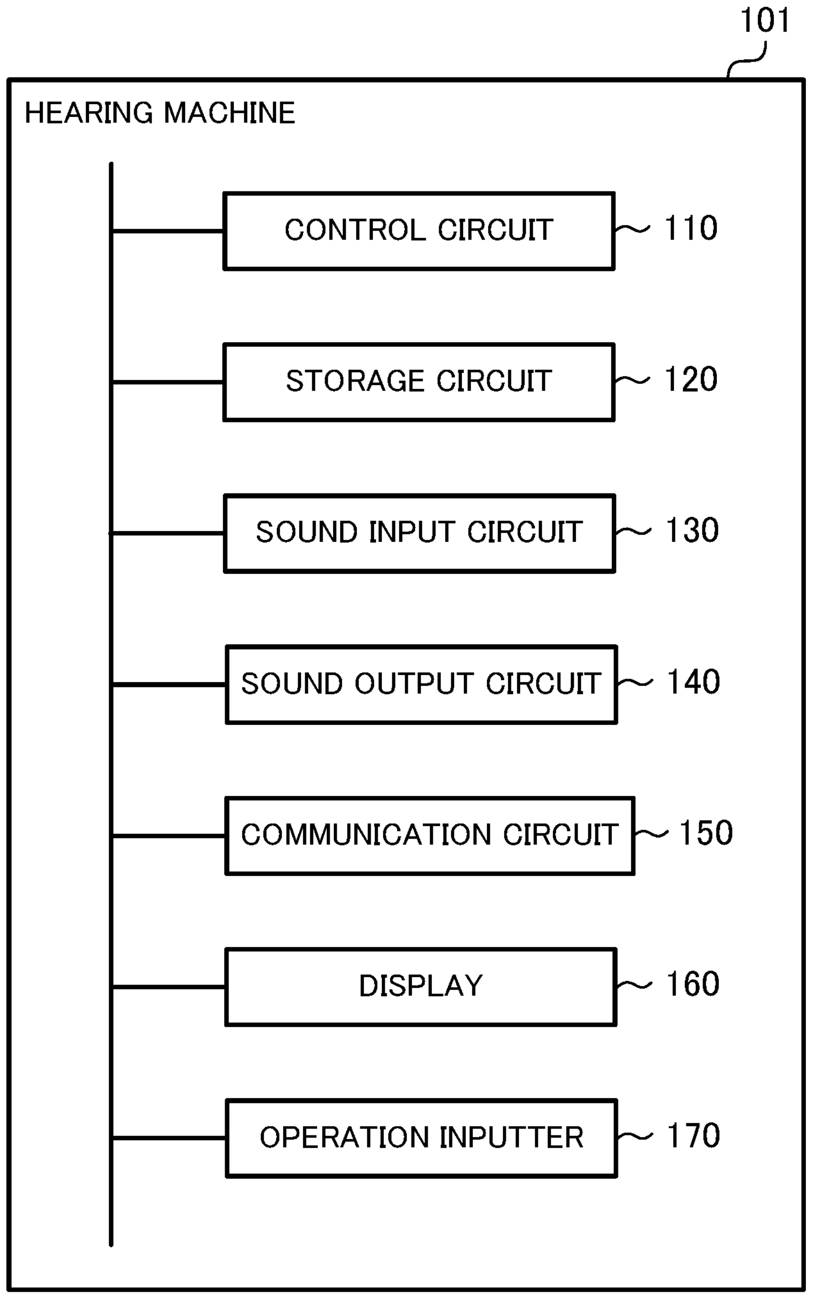
FIG. 11 is a diagram illustrating an example of a functional configuration of a hearing machine according to Embodiment 3.

As illustrated in FIG. 11, a hearing machine 101 according to Embodiment 3 includes a display 160 and an operation inputter 170 in addition to the configuration of the hearing machine 100 according to Embodiment 1. The display 160 and the operation inputter 170 are the same as the display 230 and the operation inputter 240 included in the hearing machine tuning device 200 according to Embodiment 1. The hearing machine 101 is configured by connecting a wearing device (having the same external appearance as the hearing machine 100 illustrated in FIG. 1) worn on a user's ear and a user interface (UI) device including the display 160 and the operation inputter 170 (having the same external appearance as the hearing machine tuning device 200 illustrated in FIG. 1) in a wireless or wired manner.

An automatic tuning process and a tuning information storage process according to Embodiment 3 are similar in procedure to those in Embodiments 1 and 2; however, the control circuit 110 of the hearing machine 101 performs all the processes. For example, the log data 222 is stored in the storage circuit 120 by the control circuit 110, the analysis data 223 is also generated by the control circuit 110, and the automatic tuning parameters 221 are also acquired from the analysis data 223 by the control circuit 110.

Therefore, in Embodiment 3, a process of data communication (transmission and reception of information on automatic tuning parameters and setting values) between the hearing machine 100 and the hearing machine tuning device 200 required in Embodiments 1 and 2 is unnecessary, so that the entire process is simplified.

Through the automatic tuning process and the tuning information storage process according to Embodiment 3, the control circuit 110 of the hearing machine 101 can acquire the automatic tuning parameters 221 without requiring the hearing machine tuning device 200. Subsequently, the control circuit 110 of the hearing machine 101 can automatically tune the hearing machine 101 by changing setting values to setting values for each time zone on the basis of the automatic tuning parameters 221.

The sound information display process according to Embodiment 3 is the same as the sound information display process (FIG. 10) according to Embodiments 1 and 2, except that a communication partner with the information processing device 300 is not the hearing machine tuning device 200 but the hearing machine 101. A user of the information processing device 300 according to Embodiment 3 can also confirm whether manually set values are appropriate by confirming manually tuned setting values for each time zone and the frequency spectrum of sound through the display 330, and appropriate advice can be given to a user of the hearing machine 101 or the setting values of the hearing machine 101 can be tuned to more appropriate values.

In the hearing machine 101 according to Embodiment 3, since the hearing machine 101 includes the display 160, information of the log data 222 (manually tuned setting values for each time zone, the frequency spectrum of sound, and the like) can be displayed on the display 160. A user of the hearing machine 101 according to Embodiment 3 can confirm whether manually setting values in the past are appropriate by confirming the information through the display 160. As an alternative to the display 160, the information of the log data 222 may be output by voice from the sound output circuit 140 so that a user can recognize the information. In this case, the voice may be based on parameters according to setting values in that time zone, or may be the one with a maximum parameter among the setting values.

Other Modifications

Note that the division of roles between the control circuit 110 and the control circuit 210 in each of the processes described above is not limited to the division of roles described in Embodiments 1 and 2 described above, and can be freely changed. For example, in Embodiment 2, the control circuit 110 may also perform the tuning information storage process (FIG. 7), and the hearing machine 100 may be automatically tuned without the hearing machine tuning device 200 (only with the hearing machine 100). In this case, the hearing machine 100 is quite similar to the hearing machine 101 of Embodiment 3, but is different from the hearing machine 101 in that manual setting needs to be performed by the hearing machine tuning device 200.

In the embodiments described above, the hearing machine 100 has been described as being wirelessly connected to the hearing machine tuning device 200; however, the hearing machine 100 and the hearing machine tuning device 200 may be connected by wire.

In each of the embodiments described above, in step S206, the control circuit 210 determines whether the date has changed since the day when the log data 222 was last recorded and generates the analysis data 223 in step S208 when the date had changed. However, the analysis data 223 need not always be generated when the date had changed. A user arbitrarily sets the start time for generating the analysis data 223, so that in step S206, the control circuit 210 may determine whether the set time has reached, and proceed to step S208 to analyze log data when the time has reached.

In each of the embodiments described above, hearing conditions due to changes in external factors in the hearing machine 100 are automatically changed as appropriate according to automatic tuning parameters; however, it goes without saying that when the hearing conditions are poor or too good after automatic tuning using the automatic tuning parameters, a user can optionally manually tune the hearing conditions, thereby changing automatically tuned parameters. In the embodiments described above, the hearing machine 100 is applied alone for hearing, but it may be applied as a pair of hearing machines 100 for right and left ears. In this case, each hearing machine 100 of the pair of hearing machines 100 can be tuned in accordance with the characteristics of the corresponding ear of the right and left ears by the hearing machine tuning device 200.

Note that the hearing machines 100 and 101 can also be implemented by a computer such as a wearable device that can output, to user's ears, sound that can be tuned to suit each user. Furthermore, the hearing machine tuning device 200 is not limited to a smart phone, and can also be implemented by a computer such as a tablet or a PC that can acquire data of sound acquired by the sound input circuit 130 of the hearing machine 100, and/or the like. Specifically, in above embodiments, programs to be executed by the control circuit 110 of the hearing machines 100 and 101 have been described as being stored in advance in the storage circuit 120 and programs to be executed by the control circuit 210 of the hearing machine tuning device 200 have been described as being stored in advance in the storage circuit 220. However, a computer that can execute each of the processes described above may be configured by storing the programs in a computer-readable recording medium such as a flexible disk, a compact disc read only memory (CD-ROM), a digital versatile disc (DVD), a magneto-optical disc (MO), a memory card, and a USB memory, distributing the programs, and loading and installing the programs in a computer.

Moreover, the programs can also be superimposed on carrier waves and applied via a communication medium such as the Internet. For example, the programs may be posted and distributed on a bulletin board (BBS: Bulletin Board System) on a communication network. Then, by starting the programs and executing the programs in the same way as other application programs under the control of an operating system (OS), the processes described above can be executed.

The control circuit 110 and the control circuit 210 may be configured by an arbitrary simple processor such as a single processor, a multiprocessor, or a multicore processor, or may be configured by a combination of these arbitrary processors and a processing circuit such as an application specific integrated circuit (ASIC) or a field-programmable gate array (FPGA).

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A hearing machine tuning device comprising:

at least one processor, wherein the at least one processor acquires manual tuning information including information on manually tuned setting values of a hearing machine and information on manual tuning date and time, supplies the hearing machine with automatic tuning information generated based on the acquired manual tuning information and including automatic tuning setting values, generates the automatic tuning information according to analysis data, in a case in which the manual tuning date of the acquired manual tuning information is the same as the manual tuning date of the previously acquired manual tuning information, overwrites, without analyzing the manual tuning information, the manually tuned setting value newly acquired at the manual tuning time with the previous manually tuned setting value corresponding to a time zone including the manual tuning time of the newly acquired manually tuned setting value, and in a case in which the manual tuning date of the acquired manual tuning information is not the same as the manual tuning date of the previously acquired manual tuning information, generates the analysis data by analyzing the manual tuning information.

2. The hearing machine tuning device according to claim 1, wherein the analysis data is data obtained by grouping setting values in which characteristics of the manually tuned setting values and time zones of the setting values are common in the acquired manual tuning information.

3. The hearing machine tuning device according to claim 1, wherein the manual tuning information includes information on at least one of a manually tuned day of a week or a manually tuned national holiday, and the analysis data includes information on at least one of a weekday or a holiday analyzed based on the manual tuning information.

4. The hearing machine tuning device according to claim 1, wherein the automatic tuning information includes information on time zones corresponding to the automatic tuning setting values.

5. The hearing machine tuning device according to claim 1, wherein, when a current time reaches a switching timing of the setting value, the at least one processor supplies the automatic tuning information to the hearing machine.

6. The hearing machine tuning device according to claim 1, further comprising:

an operation inputter that acquires a setting value for manually tuning a setting value of the hearing machine, wherein information on the setting value acquired through the operation inputter is supplied to the hearing machine.

7. The hearing machine tuning device according to claim 1, further comprising:

a display;

a storage circuit; and a communication circuit, wherein the communication circuit receives sound information acquired by a sound input circuit of the hearing machine, the storage circuit stores the manual tuning information including the received sound information, and the display displays information representing content of the manual tuning information.

8. The hearing machine tuning device according to claim 7, wherein the communication circuit communicates with an information processing device, and transmits the manual tuning information to the information processing device.

9. A hearing machine comprising:

a sound output circuit that outputs sound; and a hearing machine communication circuit that communicates with the hearing machine tuning device according to claim 1, wherein the sound output by the sound output circuit is tuned based on the setting value and the automatic tuning setting value.

10. The hearing machine according to claim 9, further comprising:

a clock, wherein the sound output circuit outputs sound based on the automatic tuning information including the information on time zones corresponding to the automatic tuning setting values and date and time information acquired by the clock.

11. An information processing device comprising:

a second communication circuit that communicates with the hearing machine tuning device according to claim 8;

a second display; and at least one second control circuit, wherein the second control circuit receives the manual tuning information transmitted from the hearing machine tuning device via the second communication circuit, and displays information representing content of the received manual tuning information on the second display.

12. A hearing machine tuning method comprising:

acquiring, by at least one processor, manual tuning information including information on manually tuned setting values of a hearing machine and information on manual tuning date and time;

supplying, by the at least one processor, the hearing machine with automatic tuning information generated based on the acquired manual tuning information and including automatic tuning setting values;

generating, by the at least one processor, the automatic tuning information according to analysis data;

in a case in which the manual tuning date of the acquired manual tuning information is the same as the manual tuning date of the previously acquired manual tuning information, overwriting without analyzing the manual tuning information, by the at least one processor, the manually tuned setting value newly acquired at the manual tuning time with the previous manually tuned setting value corresponding to a time zone including the manual tuning time of the newly acquired manually tuned setting value; and in a case in which the manual tuning date of the acquired manual tuning information is not the same as the manual tuning date of the previously acquired manual tuning information, generating, by the at least one processor, the analysis data by analyzing the manual tuning information.

13. A non-transitory recording medium storing a program for causing a computer to perform:

acquiring manual tuning information including information on manually tuned setting values of a hearing machine and information on manual tuning date and time;

supplying the hearing machine with automatic tuning information generated based on the acquired manual tuning information and including automatic tuning setting values;

generating the automatic tuning information according to analysis data;

in a case in which the manual tuning date of the acquired manual tuning information is the same as the manual tuning date of the previously acquired manual tuning information, overwriting, without analyzing the manual tuning information, the manually tuned setting value newly acquired at the manual tuning time with the previous manually tuned setting value corresponding to a time zone including the manual tuning time of the newly acquired manually tuned setting value; and in a case in which the manual tuning date of the acquired manual tuning information is not the same as the manual tuning date of the previously acquired manual tuning information, generating the analysis data by analyzing the manual tuning information.

* * * * *